US010185605B2

(12) United States Patent
Holzleitner et al.

(10) Patent No.: US 10,185,605 B2
(45) Date of Patent: Jan. 22, 2019

(54) IN-ORDER MESSAGE PROCESSING WITH MESSAGE-DEPENDENCY HANDLING

(75) Inventors: Manuel Holzleitner, Karlsruhe (DE); Jan Trobitius, Bruehl (DE)

(73) Assignee: SAP SE, Walldorf (DE)

( * ) Notice: Subject to any disclaimer, the term of this patent is extended or adjusted under 35 U.S.C. 154(b) by 1118 days.

(21) Appl. No.: 13/601,228

(22) Filed: Aug. 31, 2012

(65) Prior Publication Data

US 2014/0068635 A1    Mar. 6, 2014

(51) Int. Cl.
    *G06F 7/00*      (2006.01)
    *G06F 9/54*      (2006.01)
    *H04L 12/58*     (2006.01)

(52) U.S. Cl.
    CPC ........ *G06F 9/546* (2013.01); *G06F 2209/548* (2013.01); *H04L 51/00* (2013.01)

(58) Field of Classification Search
None
See application file for complete search history.

(56) References Cited

U.S. PATENT DOCUMENTS

| 7,962,708 | B2 * | 6/2011 | Kilday | G06Q 10/107 711/159 |
| 8,015,256 | B2 * | 9/2011 | Pacheco | 709/207 |
| 8,495,656 | B2 * | 7/2013 | Johnson et al. | 719/314 |
| 2007/0124398 | A1 * | 5/2007 | Parkinson | G06Q 10/10 709/206 |
| 2010/0179994 | A1 * | 7/2010 | Bittles | G06Q 10/107 709/206 |
| 2010/0257240 | A1 * | 10/2010 | Singh et al. | 709/204 |
| 2011/0113435 | A1 * | 5/2011 | Angelov et al. | 719/313 |
| 2011/0142071 | A1 * | 6/2011 | Farrell | H04L 12/586 370/473 |

OTHER PUBLICATIONS

Philip S. Yu et al "On Real-Time Databases: Concurrency Control and Scheduling" (Year: 1994).*
Subhash Bhalla "Executing Serializable Transactions within a Hard Real-time Database System" (Year: 1998).*
U.S. Appl. No. 13/534,504 filed Jun. 27, 2012, entitled "Configuring Integration Capabilities for System Integration", Inventor Daniel Ritter et al.

* cited by examiner

*Primary Examiner* — Andy Ho
*Assistant Examiner* — Abdou K Seye
(74) *Attorney, Agent, or Firm* — Fish & Richardson P.C.

(57) ABSTRACT

The disclosure generally describes computer-implemented methods, software, and systems for modeling and deploying decision services. One computer-implemented method includes operations for identifying a sequence number of a first message, the sequence number indicating a position of the first message within a first sequence of messages. If a second message positioned prior to the first message in the first sequence is in a final processing state and the second message in the first sequence is a parent message, a plurality of child messages associated with the second message are identified. Each child message is associated with a sequence number indicating a position of the child message within a second sequence associated with the plurality of child messages. The computer-implemented method determines whether a child message positioned at the end of the second sequence is in a final processing state.

19 Claims, 7 Drawing Sheets

```
302  message = sendQueue.dequeue()
304  if message.isEOIO() {
306      serializationContext = message.serializationContext
308      sequenceNumber = message.sequenceNumber 310      predeceedingMessage = sharedDatabase.lookupMessage(serializationContext, sequenceNumber - 1)

312      if isFinalPredecessor(preceedingMessage) {
314          deliver(message)
         } else {
316          message.setParked()
318          sendQueue.enqueue(message)
         }
     } def isFinalPredecessor(message) : boolean {
320      if message.isInFinalState() {
322          if not message.isParentMessage() {
324              return true;
             } else {
326                 subSequence = sharedDatabase.getSubSequenceFor(message)
328                 lastMessageInSubSequence = sharedDatabase.getLastMessageOfSequence(subSequence)

330                 if lastMessageInSubSequence.isInFinalState() {
332                     return true;
                     } else {
334                     return false;
                     }
             }
         } else {
336          return false;
         }
     }
```

BC_MSG_SUB_SEQ (400)

| COLUMN NAME | TYPE | NULL | DESCRIPTION |
|---|---|---|---|
| PARENT_SC | varchar(300) | NOT NULL | SERIALIZATION CONTEXT OF PARENT MESSAGE |
| PARENT_SEQ_NUM | bigint | NOT NULL | SEQUENCE NUMBER OF PARENT MESSAGE |
| PARENT_MSG_ID | varchar(119) | NOT NULL | MESSAGE IDENTIFICATION OF PARENT MESSAGE (PART OF MESSAGE KEY) |
| PARENT_MSG_DIR | varchar(8) | NOT NULL | DIRECTION OF THE PARENT MESSAGE (PART OF MESSAGE KEY) |
| SUB_SC | varchar(300) | NOT NULL | SERIALIZATION CONTEXT OF CHILD MESSAGE/SUB-SEQUENCE SERIALIZATION CONTEXT |
| CHILD_MSG_ID | varchar(119) | NOT NULL | MESSAGE IDENTIFICATION OF CHILD MESSAGE (PART OF MESSAGE KEY) |
| CHILD_MSG_DIR | varchar(8) | NOT NULL | DIRECTION OF THE MESSAGE (PART OF MESSAGE KEY) |
| CHILD_MSG_SEQ_NUM | bigint | NOT NULL | SEQUENCE NUMBER OF THE CHILD MESSAGE |

402 → PARENT_SC
404 → PARENT_SEQ_NUM
406 → PARENT_MSG_ID
408 → PARENT_MSG_DIR
410 → SUB_SC
412 → CHILD_MSG_ID
414 → CHILD_MSG_DIR
416 → CHILD_MSG_SEQ_NUM

IN-ORDER MESSAGE PROCESSING WITH MESSAGE-DEPENDENCY HANDLING

BACKGROUND

Message delivery is central to the operation of a distributed computing system. Whether between code-segments, applications, or devices, the exchange of information using delivered messages has become a necessary component in many computer-based products and services. However, not all messages are created equal. Depending, for example, on the content of a message and the actors between which a message is delivered, the delivery of each message may require different handling. For example, some messages may contain information that is useful to an application, but not necessary to the application's continued operation. A messaging system may give such messages a lower priority and simply make a "best effort" to deliver them. On the other hand, the nature of a set of messages may require that a messaging system ensure that these messages are not only delivered, but delivered in a particular order. A robust messaging system should be able to efficiently process messages with varying delivery requirements.

SUMMARY

The present disclosure relates to computer-implemented methods, software, and systems for in-order message processing with message-dependency handling. One computer-implemented method includes: identifying a sequence number of a first message, the sequence number indicating a position of the first message within a first sequence of messages; determining that a second message positioned prior to the first message in the first sequence is in a final processing state; determining that the second message in the first sequence is a parent message; identifying a plurality of child messages associated with the second message, each child message being associated with a sequence number indicating a position of the child message within a second sequence associated with the plurality of child messages; determining whether a child message positioned at the end of the second sequence is in a final processing state.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

The subject matter described in this specification can be implemented in particular implementations so as to realize one or more of the following advantages. First, overhead may be reduced for messages not requiring special handling. Second, messages may be processed and delivered in a required order, even where a message is not processed immediately upon receipt. Third, messages may be processed in parallel by multiple processing nodes without violating the required processing and delivery order. Fourth, a message may be split into two or more child messages during processing and the child messages may still be processed and delivered in the required order.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for in-order message processing with message-dependency handling.

For illustration purposes, the various implementations described herein will be described with regard to a messaging system that receives messages from one or more senders, processes the messages, and forwards the processed messages to one or more receivers. The described messaging system may be applied to be any computer system in which information is exchanged between, for example, code-segments, applications, and/or devices. The various messages handled by the messaging system may each require different quality of service. For example, some messages may have a low criticality and not require ensured delivery by the messaging system. In some implementations, the messaging system may handle less critical messages on a "best efforts" basis. Alternatively, some messages may include content that requires ensured, in-order delivery by the messaging system. Moreover, messages processed by the messaging system may need to be split into multiple messages during processing, as will be described in greater detail below.

Figure 1:
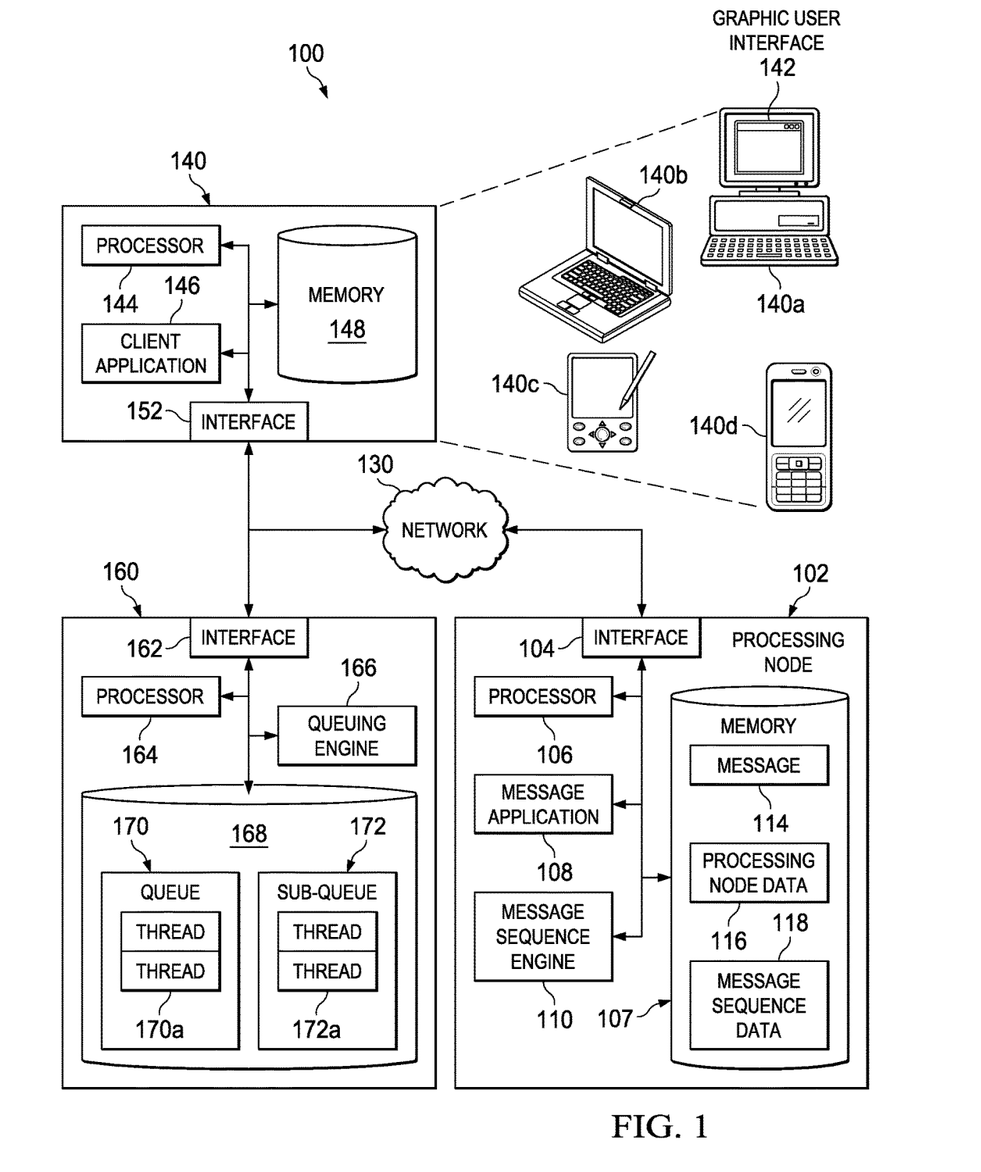
FIG. 1 is a block diagram illustrating an example system for in-order message processing with message-dependency handling.

FIG. 1 illustrates an example message system implemented in a distributed computing system 100 configured for in-order message processing with message-dependency handling. At a high-level, the illustrated example distributed computing system 100 includes or is communicably coupled with one or more processing nodes 102, a queuing database 160, and clients 140a-140d (collectively client 140) that communicate across a network 130. Though referred to and represented as a "database" for illustrative purposes, queuing database 160 may not necessarily be and/or include a database. Rather, as will be described below, queuing database 160 may take any form capable of creating and maintaining one or more queues of messages received by the message system.

The processing node 102 and queuing database 160 comprise one or more computers operable to receive, transmit, process, store, or manage data and information associated with the example distributed computing system 100. In general, the processing node 102 and queuing database 160 are one or more servers that store a message application 108, a message sequence engine 110, and a queuing engine 166, where at least a portion of the message application 108, the message sequence engine 110, and/or the queuing engine 166 is executed using messages received from a sender and sent to a receiver within and communicably coupled to the illustrated example distributed computing system 100 across network 130. In some implementations, the example distributed computing system 100 includes one queuing database 160 and multiple processing nodes 102. The queuing database 160 and multiple processing nodes 102 may be included in a single server or in multiple servers.

The message application 108, the message sequence engine 110, and/or the queuing engine 166 are used to ensure in-order message processing with message-dependency handling. In some implementations, the processing node 102 and queuing database 160 may store a plurality of various message applications 108, message sequence engines 110, and/or queuing engines 166. In other implementations, the processing node 102 and queuing database 160 may be dedicated servers meant to store and execute only a single message application 108, message sequence engine 110, and/or queuing engine 166. In still other implementations, the processing node 102 can store and execute none, a single instance, and/or a plurality of the message application 108, message sequence engine 110, and/or queuing engine 166. In some implementations, the processing node 102 and/or queuing database 160 may comprise a web server, where the message application 108, message sequence engine 110, and/or queuing engine 166 represent one or more web-based applications accessed and executed by the client 140, another processing node 102, and/or an enterprise server (not shown) using the network 130 or directly at the processing node 102 and/or queuing database 160 to perform the programmed tasks or operations of the message application 108, message sequence engine 110, and/or queuing engine 166.

Specifically, the processing node 102 and/or the queuing database 160 receive messages sent by one or more senders. In some implementations, the processing node 102 and/or the queuing database 160 receive the messages directly from the senders, while in other implementations another device or service receives the messages. The queuing database 160 stores the received messages in one or more queues using the queuing engine 166. The processing node 102 is responsible for processing received messages in the message application 108 and/or message sequence engine 110, and forwarding the processed message to a receiver. Senders and receivers of messages may be, for example, applications executed by one or more enterprise servers (not illustrated), one or more clients 140, or other processing nodes. In addition, massages may be received from and sent to internal users, external or third-party customers, other automated applications, as well as any other appropriate entities, individuals, systems, or computers. According to some implementations, processing node 102 and/or queuing database 160 may also include or be communicably coupled with an e-mail server, a web server, a caching server, a streaming data server, and/or other suitable server. In other implementations, the processing node 102 and/or queuing database 160 and their related functionality may be provided in a cloud-computing environment.

The processing node 102 and queuing database 160 include interfaces 104 and 162, respectively. Although illustrated as single interfaces 104 and 162 in FIG. 1, two or more of each of the interfaces 104 and 162 may be used according to particular needs, desires, or particular implementations of the example distributed computing system 100. The interfaces 104 and 162 are used by the processing node 102 and the queuing database 160 for communicating with other systems in a distributed environment—including within the example distributed computing system 100—connected to the network 130; for example, the client 140, as well as other systems communicably coupled to the network 130 (not illustrated), such as enterprise servers and/or additional processing nodes. Generally, the interfaces 104 and 162 comprise logic encoded in software and/or hardware in a suitable combination and operable to communicate with the network 130. More specifically, the interfaces 104 and 162 may comprise at least software supporting one or more communication protocols associated with communications such that the network 130 or interface's hardware is operable to communicate physical signals within and outside of the illustrated example distributed computing system 100.

The processing node 102 and queuing database 160 include processors 106 and 164, respectively. Although illustrated as single processors 106 and 164 in FIG. 1, two or more processors may be used according to particular needs, desires, or particular implementations of the example distributed computing system 100. Generally, the processors 106 and 164 execute instructions and manipulate data to perform the operations of the processing node 102 and queuing database 160, respectively. Specifically, the processors 106 and 164 execute at least the functionality required to receive, process, and forward messages.

The processing node 102 and queuing database 160 include memories 107 and 168 that hold data for the processing node 102 and queuing database 160, respectively. Although illustrated as single memories 107 and 168 in FIG. 1, two or more memories may be used according to particular needs, desires, or particular implementations of the example distributed computing system 100. While memories 107 and 168 are illustrated as integral components of the processing node 102 and queuing database 160, respectively, in alternative implementations, memories 107 and 168 can be external to the processing node 102 and queuing database 160 and/or the example distributed computing system 100. In some implementations, the memory 107 includes a message 114, processing node data 116, and message sequence data 118. In some implementations, the memory 168 includes a queue 170 and a sub-queue 172. Although illustrated as single instances, there may be more than one instance of the message 114, processing node data 116, message sequence data 118, queue 170, and sub-queue 172.

The message 114 is any type of message received by the message system from a sender. As will be described in greater detail below, in some implementations, the message 114 may initially be stored in the queuing database 160 along with other received messages. The processing node 102 may request the message 114 from the queuing database 160 for processing and forwarding to a receiver. In other words the message 114 is the message that the processing node 102 is currently processing. The message 114 may be in any format and contain any information, such as a text file, an email message with/without an attachment, and/or other suitable message format. Moreover, the processing node 102 may store more than one message 114 in memory 107 at a time, processing the multiple messages in serial or parallel.

The processing node data 116 may be any information used by the processing node 102 to retrieve, process, and forward message 114. In some implementations, for example, the processing node data 116 may include data necessary to route and map the message 114 such as a sender and receiver address information, message formatting information, instructions for handling different message content, and/or other suitable data.

The message sequence data 118 is data that describes the sequence of messages where the messages must be delivered in order. In some implementations, when a message that requires in-order processing is received by the messaging system, the message is assigned a serialization context and a sequence number. The serialization context identifies a sequence of messages as being related. The serialization context may be supplied by the sender or assigned by the messaging system based on, for example, the content of the messages. A sequence number identifies the position of a message within a given sequence. For example, each of a sequence of four messages associated with the creation of an object may be assigned a serialization context of "Object-Create" and sequence number between 1 and 4, depending on a particular messages required position within the sequence.

Message sequence data 118 may be accessed by the message application 108 and/or message sequence engine 110, in order to determine when message 114 should be processed and forwarded by the processing node 102. In some implementations, the queuing database 160 may store message sequence data 118 for every message in queue 170 or sub-queue 172. For example, the message sequence data 118 may be stored in a table that the message application 108 and/or message sequence engine 110 may query to obtain information. Thus, in addition to storing one or more received messages, the queue 170 or sub-queue 172 may also store a table of information regarding each queued message 114, an example of which will be described below with respect to FIG. 3. In other implementations, message sequence data 118 may be stored in any appropriate manner, for example, a flat file, binary file, database, list, etc.

In some implementations, queue 170 is a data structure for storing messages 114 received from a sender while sub-queue 172 stores "child" messages 114 that have been created from a received message 114 during the processing of the received message 114. During processing by a processing node 104, the received message 114 may be "split" into multiple child messages 114. In some implementations, the processing node 102 sends information regarding the newly created child messages 114 to the queuing database 160 and processes the child messages 114 immediately. In other implementations, the processing node 102 sends one or more of the child messages 114 themselves to queuing database 160 for storage in sub-queue 172. The queue 170 and sub-queue 172 may also store information regarding the properties of each stored message 114. The messages 114 stored in queue 170 and sub-queue 172 may be stored in any logical manner that allows the messages 114 to be accessed by the queuing engine 166 and sent to a processing node 102. For example, the queue 170 and sub-queue 172 may be one or more database structures stored in memory 168.

In some implementations, the queue 170 and sub-queue 172 may also include one or more threads 170a and 172a for processing requests received from processing nodes 102 (e.g., requests for a message 114 and/or requests for message sequence data 118). In some implementations, the queue 170 and sub-queue 172 may include a thread for each processing node 102, though a single thread may also service multiple processing nodes 102.

In some implementations, the queue 170 and sub-queue 172 may store messages that are waiting to be processed. In addition, the queue 170 and sub-queue 172 may hold processed messages for a predetermined expiration period. As will be described in greater detail with regard to FIG. 6, for messages that must be delivered in order, the expiration period may be dynamically determined based on both a period of time from receipt and/or processing and the status of other messages in the same sequence.

Though shown as separate components, queue 170 and sub-queue 172 may be implemented as a single queue or multiple sub-parts of a single queue. Moreover, though only one sub-queue 172 has been illustrated in FIG. 1, the queuing database 160 may include additional sub-queues. In some implementations, for example, the processing node 102 may process a child message (i.e., a message that was generated by splitting a parent message) and determine that the child message itself needs to be split into a sub-sub-sequence of messages. In other words, the processing node 102 and queuing database 160 may be configured to handle message splitting on a recursive basis. Therefore, the queuing database 160 may include additional sub-queues as necessary or may store all child messages, regardless of whether split from an originally received message or from a child message, in a single sub-queue 172.

The message application 108 is any type of application or set of applications that allows the receiving, processing, and forwarding of messages sent within or to computing system 100. In some implementations, the message application 108 requests a message 114 from queuing database 160, processes the message 114 for delivery to a receiver, and forwards one or more processed messages to one or more receivers. As a part of processing message 114, the message application 108 may perform multiple processing steps. In some implementations, for example, the messaging application 108 may perform routing and mapping functions on each message 114 that it receives from queuing database 160. The routing function performed by the message application 108 may include, for example, identifying and/or locating the proper receiver(s) for the message 114. The routing function may identify and/or locate the proper receiver(s) for the message 114 based on information included in the processing node data 116. The mapping function may include, for example, formatting the message 114 for the proper receiver(s) located in the routing function. The mapping function may format the message 114 based on information included in the processing node data 116. These and other processing functions may be executed by the messaging application 108 synchronously (i.e., performed over a single discrete period of time in series or parallel) or asynchronously (i.e., a subset of the processing functions are performed over a first period of time, the message 114 is sent back to the queuing database 160 or another component of computing system 100, and the remaining processing functions are performed over one or more additional periods of time by the same or a different processing node 102).

Each processing function performed by the message application 108 may split a message 114 into multiple child messages. For example, the routing function may determine that the message 114 should be forwarded to multiple receivers and create corresponding child messages (e.g., one for each receiver). Additionally or alternatively, the mapping function may determine that an interface of the identified receiver may require the content of the message 114 to be delivered in separate parts or to more than one component of the interface and create more than one child message to accommodate the receiver's interface. Because each processing function may split a message into multiple child messages, a child message, when processed through a subsequent function of the message application 108, may itself be split into more than one child message.

When the originally received message requires in-order processing and delivery, any child messages may also require in-order processing and delivery. Thus, the messaging system may need to insert dynamically created child messages into an existing message sequence. In some implementations, both the processing node 102 and queuing database 160 may both perform aspects of the child creation and sequencing functions. In some implementations, for example, the processing node 102 may create a sequence of child messages and provide each child message with a serialization context (which may or may not be related to the serialization context of the parent message from which the child messages were created). Either the processing node 102 or the queuing database 160 may assign a set of sub-sequence numbers to the child messages. The queuing database 160 may then store the newly created child messages in the sub-queue 172. In other words, once the processing node 102 has split a message 114 into multiple child messages, the processing node 102 and/or the queuing database 160 creates a sub-sequence that includes the child messages in the proper order in which they should be delivered to one or more receivers. As will be described in greater detail below, the processing node 102 and queuing database 160 may process the child messages in the newly created sub-sequence before processing any messages further along in the sequence in which the parent message 114 was a part.

In some implementations, the sequencing of messages is processed, at least in part, by the message sequence engine 110. In some implementations, the message sequence engine 110 is only used by the processing node 102 when the processing node 102 determines that the message 114 being processed is a message requiring in-order processing. As such, the processing node 102 may avoid the computing overhead incurred by the message sequence engine 110 when its functionality is unnecessary, which in a high volume messaging system may improve efficiency. However, in some embodiments, the message sequence engine 110 may be utilized for each message 114 processed by the processing node 102.

In some implementations, the primary function of the message sequence engine 110 is to provide an indication to the message application 108 whether the current message 114 retrieved from the queuing database 160 should be processed based on the state of other messages 114 in the same sequence (e.g., with the same serialization context) as the current message 114. Specifically, the message sequence engine 110 queries the queuing database 160 to determine whether the previous message 114 in the sequence prior to current message 114 has been completely processed and delivered. Moreover, the message sequence engine 110 queries the queuing database 160 to determine whether the previous message 114 in the sequence prior to current message 114 was split into multiple child messages 114 and whether all of the child messages 114 have been completely processed and delivered. The functionality of the message sequence engine 110, as well as the processing node 102 and queuing database 160 generally, will now be described with regard to an example of a message sequence shown in FIG. 2.

Figure 2:
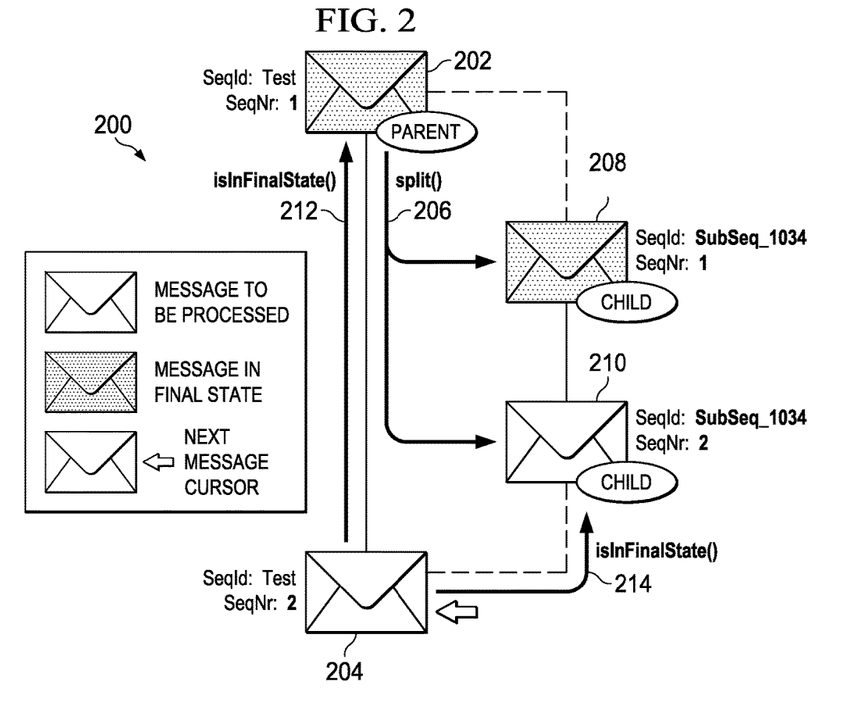
FIG. 2 is a diagram illustrating an example message sequence and a process for handling the sequence.

FIG. 2 is a diagram 200 illustrating an example message sequence and a process for handling the sequence. In the sequence shown in FIG. 2, the messaging queue 160 may store (e.g., in queue 170) a sequence of two messages that need to be delivered in order. Specifically, the messaging system may receive message 202 and message 204 from a sender. The messages 202 and 204 are part of a sequence with a common serialization identifier (i.e., "Test"). In this example, messages 202 and 204 have been given sequence numbers (SeqNr) 1 and 2, respectively. For example, the message 202 may regard the creation of an object and the message 204 may regard a function to be carried out with regard to that object. Therefore, if message 204 is received before message 202, the receiver may not be able to handle message 204, because the object has not yet been created. In some implementations, messages are given sequence numbers that reflect the order in which they were received from a sender. In other implementations, the message system may analyze the messages to determine and/or establish their proper sequence.

When a processing node retrieves message 202 from the queuing database 160, message sequence engine may query the queuing database 160 to determine whether there are any previous messages in the sequence Test that have not been processed. In other implementations, the message sequence engine may be able to determine that message 202 is the first message in the sequence without querying the queuing database 160 by, for example, recognizing that the message has been annotated with sequence number 1. With either approach however, the messaging application of the processing node may process the message 202.

As a result of processing message 202, the messaging application may split the message 202 into child messages 208 and 210 using a splitting function 206. Each child message may be appended with a serialization identifier specific to the sub-sequence of the child messages and a sequence number identifying the child message's order within the sub-sequence. In some implementations, the serialization identifier associated with the created sub-sequence of child messages is a random identifier. For example, as shown in FIG. 2, the serialization identifier of the sub-sequence associated with child messages 208 and 210 is "SubSeq_1034." In these implementations, the serialization identifier need not be meaningful outside of the message system, because the sub-sequence is created, processed, and maintained by the message system, which may track the sub-sequence and its relation to the original Test sequence through a separate mapping stored by the queuing database 160. In other implementations, the serialization identifier associated with the created sub-sequence of child messages may be a variation of the serialization identifier of the parent message. Thus, in the example illustrated in FIG. 2, the sub-sequence could be assigned a serialization identifier of "Test_SubSeq_1."

After splitting the parent message 202 into child messages 208 and 210, the processing node 102 may append each of child message 208 and 210 with a designation that indicates the occurrence of the split. In some implementations, for example, the message 202 can be appended with a designation of "parent", which indicates that the message 202 has been split. Similarly, child messages 208 and 210 may be appended with the designation of "child" to indicate that messages 208 and 210 were created as a result of a splitting operation. Moreover, when a child message is subsequently split, the processing node may append the split child message with a designation that indicates it as both a child and a parent message.

In some implementations, once a parent message has been split into a sub-sequence of child messages, the message application can designate the parent message as being "complete" or "final". Thus, a message may receive a designation of final when the message has been completely processed and delivered to a receiver or after the message has been split. Designating a message as final ensures that the message is not processed by the message system more than once and provides an indication that the next message in the sequence (or sub-sequence) may be processed.

After creating the child messages and appending them with serialization identifiers and sequence numbers, the message application may send the child messages 208 and 210 to the queuing database 160. As will be described in greater detail below, the queuing database 160 may store the child message in a sub-queue 172 for processing by the same or a different processing node 102. Moreover, the queuing database 160 may create a table or other data structure that relates the child messages to the parent message from which they were created. As a result, a processing node 102 and/or the queuing database 160 may keep track of the status of the child messages 208 and 210 in relation to the parent message 202.

As described previously, messages stored in the queuing database 160 may be processed by multiple processing nodes 102. Such parallel operation allows for efficient message processing. However, the messaging system must track the status of the messages stored in the queuing database 160 to ensure that messages requiring in-order processing are processed in the proper order. Thus, in some implementations, the same or a different processing node 102 may process message 204 from the original sequence of messages. When a processing node 102 processes message 204, the message sequence engine 110 may determine the status of the previous messages in the Test sequence.

Specifically, the message sequence engine 110 may query the queuing database 160 (e.g., with function 212) to determine whether the previous message in the sequence has been made final. Moreover, the message sequence engine 110 may query the queuing database 160 (e.g., with function 212 or another function) to determine whether the previous message in the sequence is a parent message (i.e., that the message has been split). If the queuing database 160 indicates that the previous message in the sequence is a parent message, the message sequence engine 110 may query the queuing database 160 (e.g., with function 214) to determine whether all of the messages in the sub-sequence resulting from the splitting of the parent message have been made final. If any of the child messages in the sub-sequence has also been split, the message sequence engine 110 may follow a similar procedure with regard to the sub-sub-sequences. If all of the child messages included in the sub-sequence have been made final (i.e., processing is completed, including, where appropriate, delivery of the child messages), the queuing database 160 will provide indications that the sub-sequence has been completely processed. In the case where the previous message and all split messages associated with the previous message have been made final, the message sequence engine may provide an indication to the message application that the message application may process the current message it received from the queuing database. Otherwise, the message application may send the current message back to the queuing database and request another message from the queue.

Thus, referring to the example illustrated in FIG. 2, when a processing node receives message 204, it initially queries the queuing database with function 212 to determine the status of the previous message in the sequence (i.e., message 202). Based on the information returned by the queuing database, the message sequence engine of the processing node may determine that the message 202 is complete, but that the message 202 is a parent message, which means that it has been split. Therefore, the message sequence engine may query the queuing database with function 214 to determine the status of the messages included in the sub-sequence created as a result of splitting message 202.

In some implementations, the queuing database returns the status of the last message in the sub-sequence (i.e., message 210) in response to the function 214. Because all messages, whether parent, child, or otherwise, should be handled in a similar manner, the status of the last message in sub-sequence may provide an indication of the status all messages included in the sub-sequence. Specifically, the message 210 will not have been processed and made final unless the previous message(s) in the sub-sequence (i.e., message 208) had been made final. Therefore, in response to the function 214, the queuing database may return the status of message 210 including whether the message 210 is final. In the example illustrated in FIG. 2, the message 210 is not final. Therefore, the message sequence engine may provide an indication to the message application of the process node that the message 204 should not yet be processed in order to ensure that the messages in the Test sequence are processed in the proper order.

Figure 3:
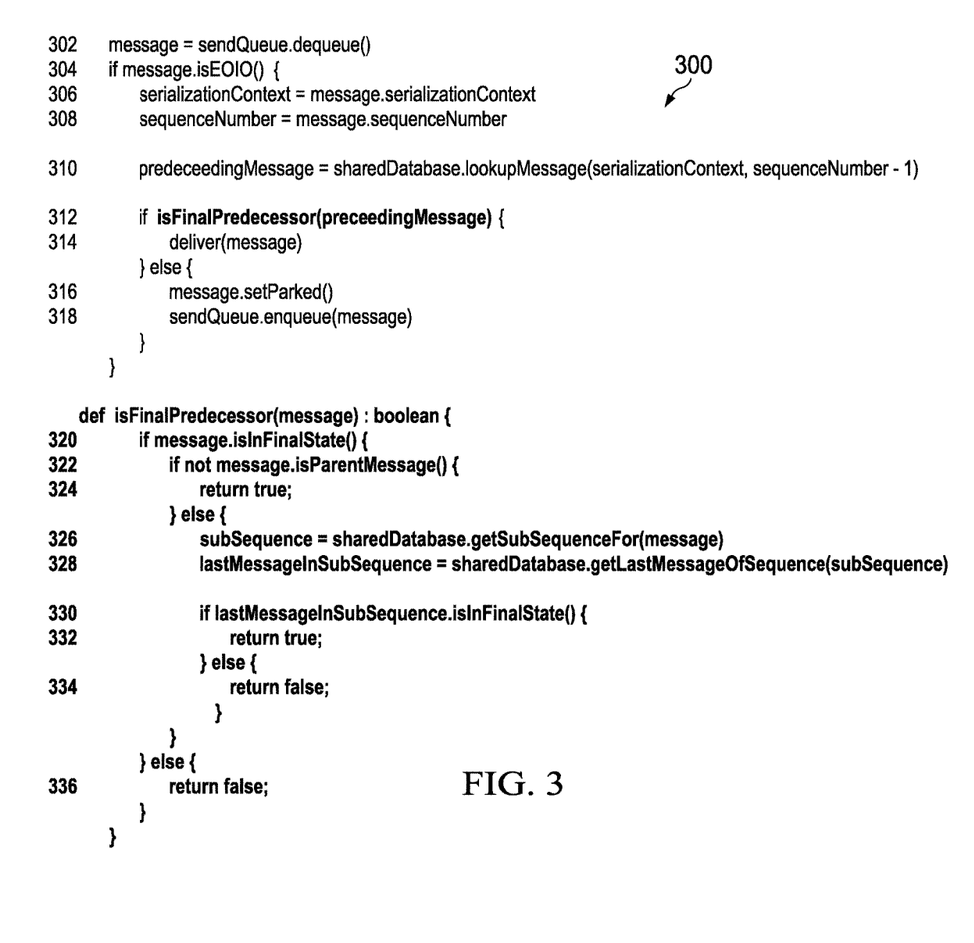
FIG. 3 is an example of pseudo-code for performing message handling.

FIG. 3 illustrates is an example of pseudo-code 300 for performing message handling in a manner similar to that described above with regard to FIG. 2. For illustrative purposes, the pseudo-code will be described with regard to an implementation in which the pseudo-code is executed by the message sequence engine of a processing node. However, in other implementations, the pseudo-code may be executed by other components of a processing node (e.g., the message application) or by the queuing database before or after providing a message to a processing node.

At line 302, the message sequence engine requests a new message from the queuing database to be processed by the message application. In line 304, the message sequence engine determines whether the message retrieved from the queuing database is a message that requires in order processing. If the message retrieved from the queuing database does not require in order processing, the message sequence engine provides an indication to the message application to process the message normally. If, however, the message retrieved from the queuing database requires in order processing, at lines 306 and 308, the message sequence engine determines the serialization context and sequence number for the message.

At line 310, the message sequence engine requests information regarding the previous message in the sequence. In some implementations, the queuing database may search the queue for the message having the same serialization context and one less sequence number as the message retrieved from the queuing database. In some implementations, the queuing database may provide a link to the previous message or provide a data structure including header information from the previous message (including, for example, whether the previous message has been made final and whether it is a parent message).

Based on the information retrieved from the queuing database regarding the previous information, the message sequence engine executes, at line 312, a function to determine whether the previous message and any sub-sequences associated with the previous message have been made final. If the previous message and any sub-sequences associated with the previous message have been made final, the message sequence engine provides, at 314, an indication to the message application that it may process the message retrieved from the queuing database. If however, the previous message or any sub-sequences associated with the previous message have not been made final, the message sequence engine may "park" the retrieved message (line 316) and send it back to the queuing database (line 318).

Parking a retrieved message prevents the message from being removed from the queue again and again only to determine that the message cannot be processed yet because the predecessor is not in a final state. Thus, when the queuing database receives a "parked" message, it inserts the message into a separate structure for parked messages where it will be stored, without consuming resources, until the queuing database receives a notification that the parked message should be unparked and replaced in the queue. In some implementations, the notification to unpark a message is triggered by a processing node that completes the processing of the previous message in the sequence (i.e., an in-order message with the same serialization context as the parked message and the previous sequence number). Thus, a notification to unpark message may include the serialization context of the finished message and the sequence number increased by one.

The function to determine whether the previous message and any sub-sequences associated with the previous message have been made final is shown at lines 320-336. In line 320, the message sequence engine determines whether the previous message is in a final state. If the previous message is not in a final state, the function returns false, at line 336. However, if the previous message is in a final state, the message sequence engine determines whether the previous message is a parent message, at line 322. At line 324, if the previous message is not a parent message, the function returns true.

However, at lines 326 and 328, if the previous message is a parent message, meaning that it has been split into a sub-sequence of child messages, the message sequence engine queries the queuing database to determine information about the status of the child messages included in the sub-sequence associated with the previous message. Specifically, in line 328, the message sequence engine requests information regarding the state of the last message in the sub-sequence. At line 330, if the last message in the sub-sequence has been made final, the function returns true at line 332. If however, the last message in the sub-sequence is not final, the function returns false in line 334.

Returning to FIG. 1, the queuing database 160 stores the messages 114 received by the messaging system from a sender, as well as information about these received messages 114. Specifically, queuing engine 166 receives messages 114 and stores the received messages 114 in the proper queue 170 or sub-queue 172. Moreover, queuing engine 166 responds to requests from the processing nodes 102 from information regarding a message 114. In some implementations, the queuing engine 166 may maintain a sub-queue mapping table (further described below with FIG. 4) or other data structure that relates child messages 114 included in a sub-sequence with the parent message 114 from which they were split.

Figure 4:
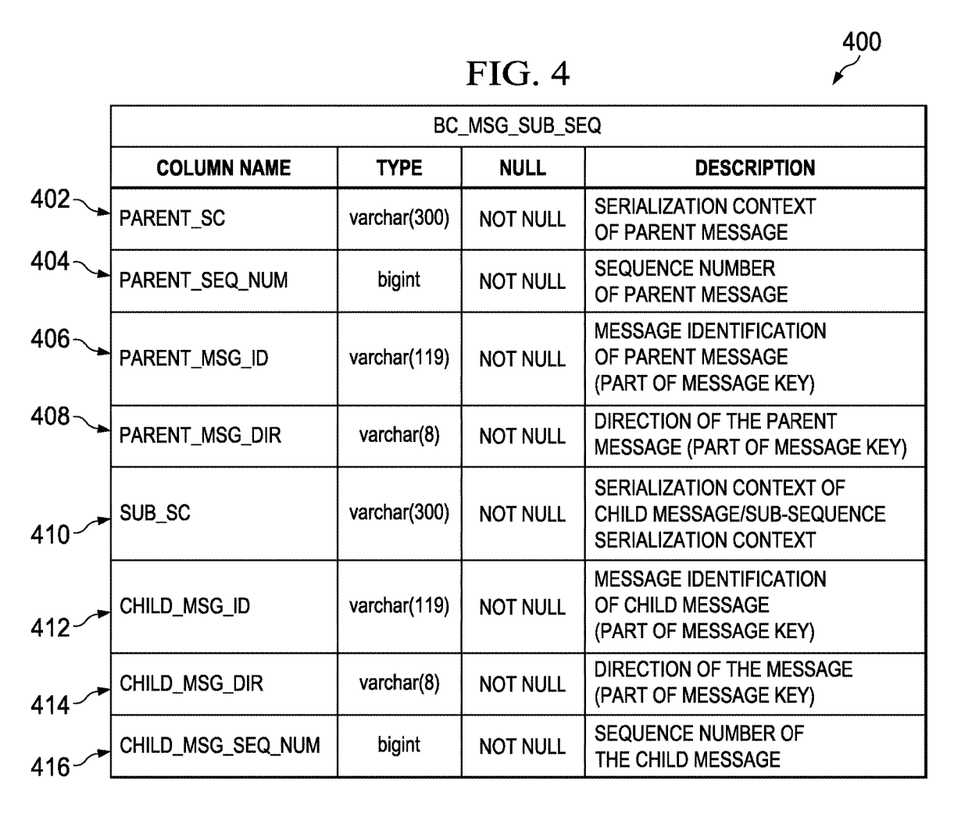
FIG. 4 is a table illustrating components of an example sub-queue mapping table.

FIG. 4 is a table 400 illustrating components of an example sub-queue mapping table. The sub-queue mapping table may include components 402-416 for each child message 114 stored in a sub-queue 172. The PARENT_SC component 402 may include the serialization context of the parent message of the child message. The PARENT_SEQ_NUM component 404 may include the sequence number of the parent message of the child message. The message PARENT_MSG_ID component 406 and PARENT_MSG_DIR component 408 may together provide a unique identifier for the parent message of the child message. The SUB_SC component 410 may include the serialization context of the child component. The CHILD_MSG_ID component 412 and CHILD_MSG_DIR component 414 may together provide a unique identifier for child message. The CHILD_MSG_SEQ_NUM component 416 may include the sequence number of the child message.

In some implementations, the queuing engine 166 can create a single sub-queue mapping table for all of the messages stored in a sub-queue. In other implementations, the queuing engine 166 may create a sub-queue mapping table for each sub-sequence. A sub-queue mapping table specific to a sub-sequence may include information regarding the parent message from which the sub-sequence was created and information regarding each of the child messages included in the sub-sequence. A sub-queue mapping table specific to a sub-sequence may be structured similar to the sub-queue mapping table shown in FIG. 4 or any other logical form capable of relating one or more child messages to the parent message from which they were created.

In some implementations, when a processing node 102 requests information regarding a sub-sequence of child messages created from a parent message, the queuing engine 166 may reference the sub-queue mapping table to create a list of all the child messages in the sub-sequence and stored in the sub-queue. Based on the list of all the child messages in the sub-sequence, the queuing engine 166 may identify the last child message in the sub-sequence based on the sequence numbers of the child messages. The queuing engine 166 may forward information regarding the last child message in the sub-sequence to the processing node.

Returning to FIG. 1, the client 140 may be any computing device operable to connect to or communicate with at least the enterprise server 102 using the network 130. In general, the client 140 comprises a computer operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 may send and receive messages using processing node 102 and queuing database 160. Once a particular client application 146 is launched, a user may interactively process a task, event, or other information, which may require that messages be sent to components within the distributed computer 100 or other components not illustrated. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the processing node 102 and queuing database 160 as well as other systems communicably coupled to the network 130 (not illustrated). The interface 152 may also be consistent with the above-described interface 104 of the processing node 102 or other interfaces within the example distributed computing system 100. The processor 144 may be consistent with the above-described processor 106 of the processing node 102 or other processors within the example distributed computing system 100. Specifically, the processor 144 executes instructions and manipulates data to perform the operations of the client 140, including the functionality required to send messages to and receive messages from the processing node 102 and queuing database 160. The memory 148 may be consistent with the above-described memory 107 of the processing node 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the computing system 100. Generally, through the GUI 142, a user is provided with an efficient and user-friendly presentation of data provided by or communicated within the example distributed computing system 100.

There may be any number of clients 140 associated with, or external to, the example distributed computing system 100. For example, while the illustrated example distributed computing system 100 includes one client 140 communicably coupled to the processing node 102 and queuing database 160 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the processing node 102 and queuing database 160 or the client 140 itself, including digital data, visual information, or a GUI 142, as shown with respect to the client 140.

Figure 5A:
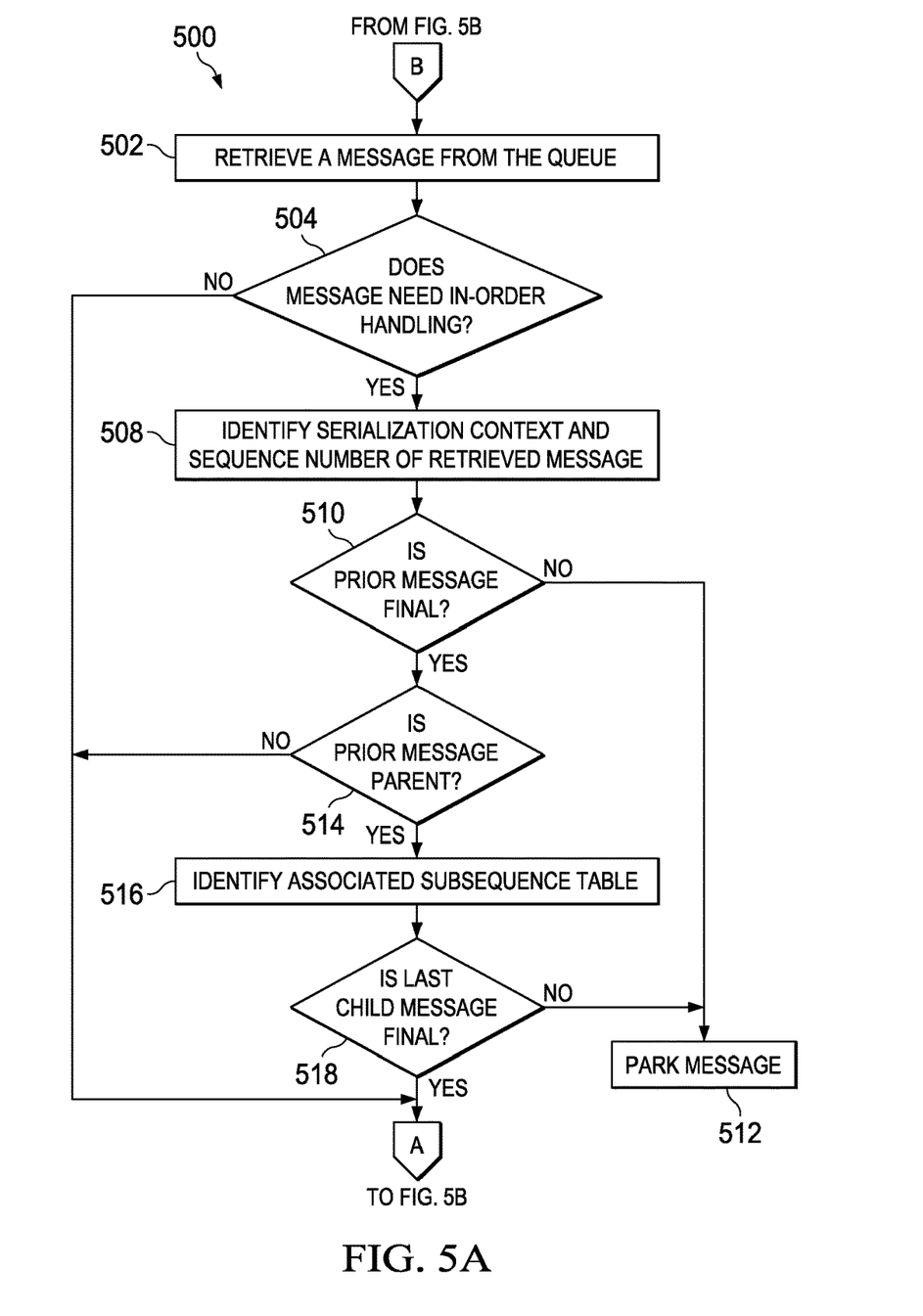
FIGS. 5A and 5B illustrate a flow chart for processing messages in order.
Figure 5B:
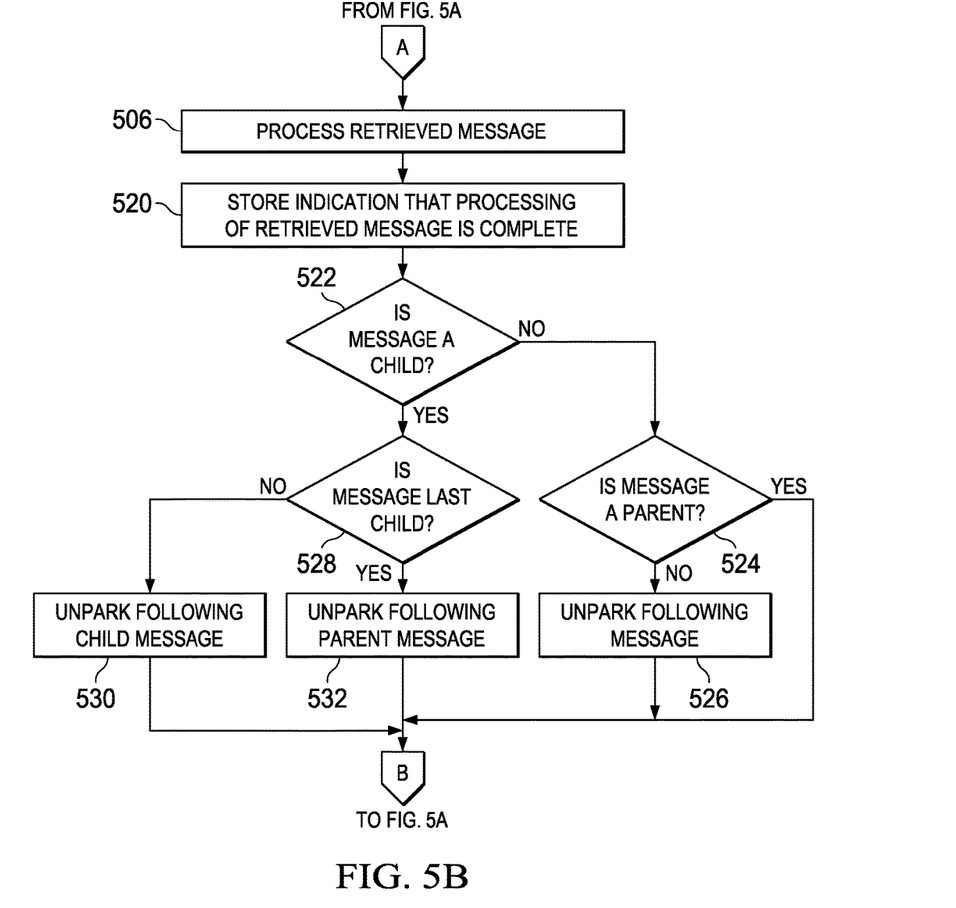

Turning now to FIGS. 5A and 5B, FIGS. 5A and 5B illustrate a flow chart 500 for processing messages in order. For clarity of presentation, the description that follows generally describes method 500 in the context of FIGS. 1-4. However, it will be understood that method 500 may be performed, for example, by any other suitable system, environment, software, and hardware, or a combination of systems, environments, software, and hardware as appropriate. For example, one or more of the processing node, the queuing database, the client, or other computing device (not illustrated) can be used to execute method 500 and obtain any data from the memory of the client, the processing node, the queuing database, or the other computing device (not illustrated).

At 502, the queuing database retrieves a message from the queue to process. In some implementations, the queuing database sends the retrieved message to a processing node and the processing node checks the status of the message. In other implementations, the queuing database checks the status of the retrieved message prior to sending it to the processing node for processing.

At 504, the queuing database and/or processing node determine whether the retrieved message is a message that requires in-order processing. If the message does not require in-order processing, the process 500 skips to 506 where the processing node processes the retrieved message. By skipping to 506, the queuing database and/or processing node avoid the extra overhead of checking the status of the retrieved message.

If the retrieved message does require in-order processing, at 508, queuing database and/or processing node identifies the serialization context and sequence number of the retrieved message. The queuing database and/or processing node may use this information to identify and locate other messages in the same sequence as the retrieved message. Based on the serialization context and sequence number of the retrieved message, at 510, the queuing database and/or processing node determine whether the prior message in the sequence has been made final.

If the previous message in the sequence has not been made final, at 512, the queuing database and/or processing node returns the retrieved message to the queuing database with an indication that the message should be parked. However, if the previous message in the sequence has been made final, at 514, the queuing database and/or processing node determine whether the previous message in the sequence is a parent message. If, however, the previous node in the sequence is a parent message, the queuing database and/or processing node checks the status of the child messages associated with the previous message. Specifically, at 516, the queuing database and/or processing node identify a sequence mapping table associated with the previous message. Based on the associations stored in the identified sequence mapping table, at 518, the queuing database and/or processing node determine whether the last child message in the sub-sequence of child messages associated with the previous message has been made final.

At 512, if the last child message in the sub-sequence of child messages associated with the previous message has not been made final, the queuing database and/or processing node returns the retrieved message to the queuing database with an indication that the message should be parked so that the all of the child messages associated with the previous message in the sequence may be completely processed and made final. However, if the last child message in the sub-sequence of child messages associated with the previous message has been made final, at 506, the retrieved message is processed by the processing node.

If the previous message in the sequence is not a parent message, at 506, the processing node processes the retrieved message. By skipping operations 516 and 518 for in-order messages whose predecessor message is not a parent message, the processing node minimizes overhead for in-order messages without subsequences (i.e., child messages). After the retrieved message has been completely processed by the processing node, at 520, the queuing database stores an indication that the retrieved message has been completely processed and, where appropriate, delivered. After 520, the process 500 determines whether a notification should be created to instruct the queuing database to unpark any messages.

Specifically, at 522, the queuing database and/or processing node determine whether the completed message is a child message (i.e., a message in a subsequence). If the completed message is not a child message, at 524, the queuing database and/or processing node determine whether the completed message is a parent message (i.e., processing of the completed message resulted in the creation of one or more child messages). If the completed message is not a parent message, the processing node may create, at 526, a notification to unpark the next message in the sequence. Such a notification may include the serialization context of the completed message and the sequence number of the completed message incremented by one. If, however, the completed message is a parent message, the process 500 returns to 502.

Returning to 522, if the completed message is a child message, at 528, the queuing database and/or processing node determine whether the completed message is the last child message in the sub-sequence. If the completed message is not the last child message in a sub-sequence, at 530, the processing node may create a notification to unpark the next child message in the sub-sequence. If, however, the completed message is the last child message in a sub-sequence, at 532, the processing node may create a notification to unpark the next message in the sequence of which the parent message of the completed message was a part. In other words, if the completed message is the last child message in a sub-sequence, the sub-sequence is complete, so the parent sequence may continue to be processed and delivered in order After the processing node creates a notification, process 500 returns to 502.

After a message has been completely processed by a processing node, the queuing database may retain a copy of the message or information about the message and its status. In some implementations, the queuing database may employ a clean-up process to delete the completed message and any information related to it after a predetermined amount of time. However, even if the predetermined amount of time has passed, deleting the information associated with a completed message may interfere with the process 500 described above if the next message in the sequence has not been processed yet. Specifically, if the queuing database and/or processing node executes process 500 for a message and the queuing database has deleted the information associated with the previous message in the sequence during a clean-up process, the queuing database and/or processing node will be unable to properly ensure that the messages in the sequence are delivered in order. Therefore, the clean-up process should take into account the state of other messages in a sequence and/or subsequence before deleting information associated with a message.

Figure 6:
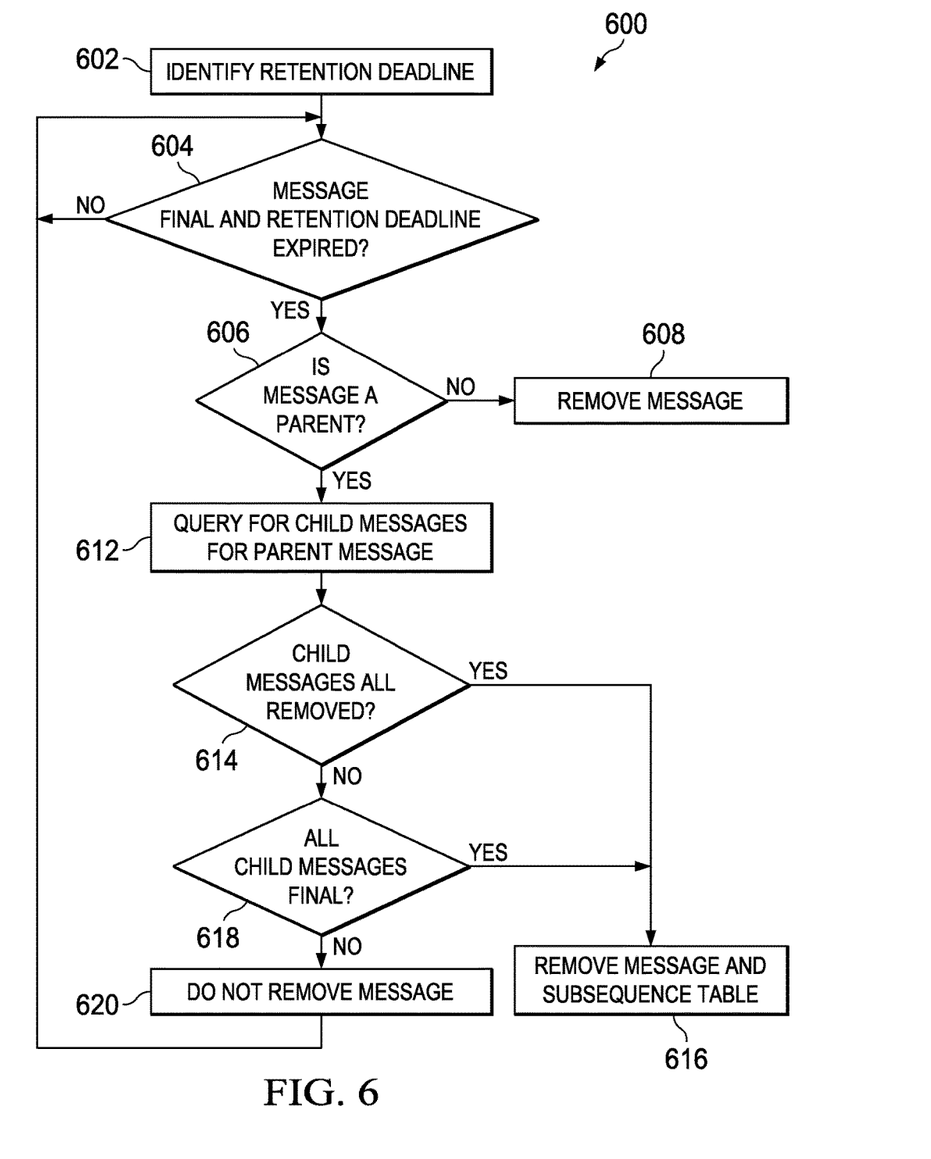
FIG. 6 is a flow chart for message clean-up accounting for message dependency.

Turning now to FIG. 6, FIG. 6 illustrates a flow chart 600 for message clean-up accounting for message dependency. For clarity of presentation, the description that follows generally describes method 600 in the context of FIGS. 1-4. However, it will be understood that method 600 may be performed, for example, by any other suitable system, environment, software, and hardware, or a combination of systems, environments, software, and hardware as appropriate. For example, one or more of the processing node, the queuing database, the client, or other computing device (not illustrated) can be used to execute method 600 and obtain any data from the memory of the client, the processing node, the queuing database, or the other computing device (not illustrated).

At 602, the queuing database determines the retention deadline for information associated with a completed message. The queuing database may retain information associated with a completed message, as well as a copy of the message, for a predetermine retention period. The predetermined retention period may be selected based on the needs and capabilities of the queuing database. The longer information associated with a completed message must be retained the more storage that must be available on the queuing database.

At 604, the queuing database determines whether a message is final and the queuing database has retained information associated with the completed message beyond the predetermined period for retaining the information (i.e., the information has passed the retention deadline). For each completed message, the queuing database may continually or periodically check to determine whether retained information associated with the completed message has reached the retention deadline.

At 606, if the queuing database determines that a message is final and the retention deadline for information associated with the completed message has expired, the queuing database determines whether the completed message is a parent message. If the completed message is not a parent message (i.e., the completed message has no child messages), at 608, the queuing database removes the message and any information associated with the message. If, however, the completed message is a parent message, at 612, the queuing database queries for any child messages associated with the completed parent message. In some implementations, the queuing database may query for child messages by searching for the last child message in the sub-sequence. If, at 614, no information is found in the queuing database regarding the child messages associated with the completed message (e.g., the child messages have already been removed), at 616, the queuing database removes the completed parent message and any information associated with the parent message, including, for example, the message's sub-sequence table.

If, at 614, information is found in the queuing database regarding the child messages, at 618, the queuing database determines whether all of the child messages associated with the completed parent message have been made final. If all of the child messages associated with the completed parent message have been made final, the queuing database removes the completed message and any information associated with the parent message. If, however, all of the child messages associated with the completed parent message have not been made final, at 620, the queuing database determines that the completed message should not be removed yet. In other implementations, at 618, the queuing database determines whether at least one of the child messages associated with the completed parent message has not been made final. In yet other implementations, at 618, the queuing database determines whether the last child message associated with the completed parent message has been made final.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   receiving, at a first processing node and from a queuing database, a first message;
   identifying a sequence number of the first message, the sequence number indicating a position of the first message within a first sequence of messages at the queuing database, the first sequence of messages comprising a serialized sequence of messages wherein messages positioned prior in the serialized sequence must be processed before messages positioned thereafter in the serialized sequence; and
   after receiving the first message and before processing the first message:
      identifying a second message positioned prior to the first message in the first sequence of messages based on the sequence number;
      querying the queuing database to determine that the second message prior to the first message is in a final processing state, wherein the second message is processed by a second processing node different than the first processing node;
      in response to determining that the second message is in the final processing state, querying the queuing database to determine whether the second message in the first sequence of messages is a parent message associated with a plurality of child messages;
      in response to determining that the second message is a parent message, identifying the plurality of child messages associated with the second message, each one of the plurality of child messages associated with a sequence number indicating a position of the respective child message within a second sequence separate from the first sequence and a sequence identifier identifying the second sequence, wherein the second sequence is a serialized sub-sequence of the second message in the first sequence;
      determining whether a child message of the plurality of child messages positioned at the end of the second sequence is in a final processing state;
      determining a retention deadline for the second message based on a predefined retention period; and
      in response to determining that the second message has reached the retention deadline and that the child message of the plurality of child messages positioned at the end of the second sequence is in the final processing state, removing the second message and the plurality of child messages associated with the second message.

2. The computer-implemented method of claim 1, wherein:
   the identifying the second message positioned prior to the first message in the first sequence of messages further includes locating the second message based on a serialization context of the first message.

3. The computer-implemented method of claim 1, wherein the identifying the plurality of child messages associated with the second message includes accessing a mapping table that indicates an association between the second message and the plurality of child messages.

4. The computer-implemented method of claim 1, further comprising:
   determining that the child message of the plurality of child messages positioned at the end of the second sequence is not in the final processing state; and
   returning the first message to a message queue.

5. The computer-implemented method of claim 1, further comprising:
   determining that the child message of the plurality of child messages positioned at the end of the second sequence is in the final processing state; and
   processing the first message.

6. The computer-implemented method of claim 5, wherein the processing the first message includes delivering the first message to a destination included in the first message.

7. The computer-implemented method of claim 1, wherein the determining whether the second message is a parent message includes determining whether the second message is appended with a designation indicating a parent.

8. A system comprising:
one or more computers associated with an enterprise portal; and
a computer-readable medium coupled to the one or more computers including instructions stored thereon which, when executed by the one or more computers, cause the one or more computers to perform operations comprising:
receiving, at a first computer of the one or more computers and from a queuing database, a first message;
identifying a sequence number of the first message, the sequence number indicating a position of the first message within a first sequence of messages at the queuing database, the first sequence of messages comprising a serialized sequence of messages wherein messages positioned prior in the serialized sequence must be processed before messages positioned thereafter in the serialized sequence; and
after receiving the first message and before processing the first message:
identifying a second message positioned prior to the first message in the first sequence of messages based on the sequence number;
querying the queuing database to determine that the second message prior to the first message is in a final processing state, wherein the second message is processed by a second computer of the one or more computers different than the first computer;
in response to determining that the second message is in the final processing state, querying the queuing database to determine whether the second message in the first sequence of messages is a parent message associated with a plurality of child messages;
in response to determining that the second message is a parent message, identifying the plurality of child messages associated with the second message, each one of the plurality of child messages associated with a sequence number indicating a position of the respective child message within a second sequence separate from the first sequence and a sequence identifier identifying the second sequence, wherein the second sequence is a serialized sub-sequence of the second message in the first sequence;
determining whether a child message of the plurality of child messages positioned at the end of the second sequence is in a final processing state;
determining a retention deadline for the second message based on a predefined retention period; and
in response to determining that the second message has reached the retention deadline and that the child message of the plurality of child messages positioned at the end of the second sequence is in the final processing state, removing the second message and the plurality of child messages associated with the second message.

9. The system of claim 8, wherein:
the identifying the second message positioned prior to the first message in the first sequence of messages further includes locating the second message based on a serialization context of the first message.

10. The system of claim 8, wherein the identifying the plurality of child messages associated with the second message includes accessing a mapping table that indicates an association between the second message and the plurality of child messages.

11. The system of claim 8, wherein the computer-readable medium further includes instructions stored thereon which, when executed by the one or more computers, cause the one or more computers to perform operations comprising:
determining that the child message of the plurality of child messages positioned at the end of the second sequence is not in the final processing state; and
returning the first message to a message queue.

12. The system of claim 8, wherein the computer-readable medium further includes instructions stored thereon which, when executed by the one or more computers, cause the one or more computers to perform operations comprising:
determining that the child message of the plurality of child messages positioned at the end of the second sequence is in the final processing state; and
processing the first message.

13. The system of claim 12, wherein the processing the first message includes delivering the first message to a destination included in the first message.

14. A computer-program product encoded on a tangible, non-transitory storage medium, the product comprising computer-readable instructions for causing one or more processors to perform operations comprising:
receiving, at a first processor of the one or more processors and from a queuing database, a first message;
identifying a sequence number of the first message, the sequence number indicating a position of the first message within a first sequence of messages at the queuing database, the first sequence of messages comprising a serialized sequence of messages wherein messages positioned prior in the serialized sequence must be processed before messages positioned thereafter in the serialized sequence; and
after receiving the first message and before processing the first message:
identifying determining that a second message positioned prior to the first message in the first sequence of messages based on the sequence number;
querying the queuing database to determine that the second message prior to the first message is in a final processing state, wherein the second message is processed by a second processor of the one or more processors different than the first processor;
in response to determining that the second message is in the final processing state, querying the queuing database to determine whether the second message in the first sequence of messages is a parent message associated with a plurality of child messages;
in response to determining that the second message is a parent message, identifying the plurality of child messages associated with the second message, each one of the plurality of child messages associated with a sequence number indicating a position of the respective child message within a second sequence separate from the first sequence and a sequence identifier identifying the second sequence, wherein the second sequence is a serialized sub-sequence of the second message in the first sequence;
determining whether a child message of the plurality of child messages positioned at the end of the second sequence is in a final processing state;

determining a retention deadline for the second message based on a predefined retention period; and in response to determining that the second message has reached the retention deadline and that the child message of the plurality of child messages positioned at the end of the second sequence is in the final processing state, removing the second message and the plurality of child messages associated with the second message.

15. The computer-program product of claim 14, wherein: the identifying the second message positioned prior to the first message in the first sequence of messages further includes locating the second message based on a serialization context of the first message.

16. The computer-program product of claim 14, wherein the identifying the plurality of child messages associated with the second message includes accessing a mapping table that indicates an association between the second message and the plurality of child messages.

17. The computer-program product of claim 14, further comprising computer-readable instructions for causing one or more processors to perform operations comprising:

determining that the child message of the plurality of child messages positioned at the end of the second sequence is not in the final processing state; and returning the first message to a message queue.

18. The computer-program product of claim 14, further comprising computer-readable instructions for causing one or more processors to perform operations comprising:

determining that the child message of the plurality of child messages positioned at the end of the second sequence is in the final processing state; and processing the first message.

19. The computer-program product of claim 18, wherein the processing the first message includes delivering the first message to a destination included in the first message.

* * * * *